United States Patent [19]

Niezborala et al.

[11] Patent Number: 5,629,963
[45] Date of Patent: May 13, 1997

[54] STORAGE TANK FOR A RADIOACTIVE FISSILE MATERIAL SOLUTION

[75] Inventors: Jean-Marc Niezborala, Rueil-Malmaison; Jacques Bara, Hermeray; François Justin, Villebon sur Yvette, all of France

[73] Assignee: Compagnie Generale des Matieres Nucleaires, Velizy-Villacoublay, France

[21] Appl. No.: 436,456

[22] PCT Filed: Nov. 18, 1993

[86] PCT No.: PCT/FR93/01135

§ 371 Date: May 17, 1995

§ 102(e) Date: May 17, 1995

[87] PCT Pub. No.: WO94/11883

PCT Pub. Date: May 26, 1994

[30] Foreign Application Priority Data

Nov. 19, 1992 [FR] France ................. 92 13906

[51] Int. Cl.[6] ................................. G21F 5/002
[52] U.S. Cl. .............. 376/272; 376/287; 250/506.1; 976/DIG. 342
[58] Field of Search ................. 376/272, 287; 250/506.1, 507.1, 518.1; 588/1, 20; 976/DIG. 342

[56] References Cited

U.S. PATENT DOCUMENTS

| 3,845,315 | 10/1974 | Blum | 376/272 |
| 3,882,313 | 5/1975 | Siemens, Jr. | 376/272 |
| 4,649,018 | 3/1987 | Waltersdorf et al. | 376/272 |
| 4,836,975 | 6/1989 | Guldner et al. | 376/272 |

FOREIGN PATENT DOCUMENTS

| 0269885 | 6/1988 | European Pat. Off. |
| 2543353 | 3/1984 | France . |
| 2300620 | 7/1974 | Germany . |
| 3807775 | 9/1989 | Germany . |
| 9109368.6 | 10/1991 | Germany . |
| 855420 | 11/1960 | United Kingdom . |

*Primary Examiner*—Daniel D. Wasil
*Attorney, Agent, or Firm*—Brinks Hofer Gilson & Lione

[57] ABSTRACT

A storage tank for radioactive fissile material solutions. The tank comprises at least one cell containing a radioactive solution and a solid neutron-absorbing material while preventing any risk of criticality. A network of substantially vertical tubes is arranged within said cell and metal walls completely separate the radioactive solution from the solid neutron absorbing material. Said tubes contain the neutron absorbing material and are located in compartments defined by the metal walls throughout the radioactive solution. Said tank occupies a reduced floor space.

7 Claims, 2 Drawing Sheets

STORAGE TANK FOR A RADIOACTIVE FISSILE MATERIAL SOLUTION

The present invention relates to a tank for the storage tank for radioactive fissile material solutions.

Said radioactive fissile material solutions have to be warehoused or stored in tanks or reservoirs whose geometry and/or constituents make it possible to avoid the risks of criticality. Said tanks are referred to as subcritical tanks.

The tanks known hitherto contain a volume of neutron absorbing material in contact with which or within which there has been created at least one internal space or channel for containing the radioactive solution.

The tanks used are especially parallelepipedal tanks containing a channel of rectangular cross-section for radioactive solution, or cylindrical tanks containing an annular channel for radioactive solution. To prevent the formation of critical masses, said parallelepipedal channel must have a rectangular cross-section of small width; said annular channel is likewise of limited width.

Such configurations greatly limit the storage capacities and are therefore unsatisfactory.

It is not possible, however, to imagine increasing the length or diameter of said tanks without restriction, since this would present problems of space requirement, rigidity and manufacture.

Patent application FR-A-2 212 820 has proposed an improvement to cylindrical tanks with annular channels.

A novel arrangement is now proposed for storage tanks for radioactive fissile material solutions.

Said novel arrangement makes it possible in particular to reduce the space requirement for a given stored volume.

The tanks according to the invention comprise at least one cell for containing the radioactive solution and solid neutron absorbing material for avoiding the risks of criticality; the opposite surfaces between said radioactive solution and said neutron absorbing material are increased within said cell, said radioactive solution being separated from said neutron absorbing material by metal walls.

According to a characteristic feature, an array of substantially vertical tubes containing solid neutron absorbing material is arranged within said cell, said tubes having metal walls and being located in compartments delimited by other metal walls and distributed throughout said radioactive solution.

Said tubes can be of any shape. In particular, their cross-section can be circular, square, oval (ellipsoidal) etc. The same comment applies to the shape of the cell or cells and that of the tank.

Said solid neutron absorbing material is the one conventionally used in this technical field. It can consist especially of boron polyethylene plaster (BPP), boron concrete, boron bitumens or permali, etc.

Said radioactive solution and said solid neutron absorbing material are separated by metal walls, generally two metal walls, one of them being the wall of the tubes of the array.

The constituent material of said walls is generally stainless steel. However, other materials, such as zirconium or titanium, can be used, especially for walls in contact with the radioactive solution.

The presence of these walls within the tanks according to the invention is particularly advantageous. Irrespective of the variant, said walls perform numerous functions. In addition to their function of retaining material (solid neutron absorbing material or radioactive solution), they contribute especially to enhancing the rigidity of the assembly, governing its geometry and protecting said assembly from corrosion, fire etc. They also play an advantageous role in its production. The value of said walls will be understood more clearly from the following description of the invention. It will be noted incidentally here that the present invention is not limited to these variants.

According to the invention, the tubes contain the neutron absorbing material and are located in compartments delimited by metal walls and distributed throughout the radioactive solution. In this embodiment, the metal walls which separate the radioactive solution from the neutron absorbing material therefore consist on the one hand of the wall of the tubes containing said neutron absorbing material, and on the other hand of the wall of the compartments within which said tubes are positioned. These two types of walls can be made of stainless steel. It is also possible to provide stainless steel tubes for the neutron absorbing material and zirconium or titanium walls for the compartments inside which said tubes of neutron absorbing material are positioned.

In a variant of the invention, the tubes of neutron absorbing material advantageously take the form of stainless steel can filled with neutron absorbing material. Said cans are located in the compartments distributed throughout the radioactive solution.

Said compartments have been arranged within the cell before it is filled. It has been possible, in particular, to provide the bottom plate of said cell with welding lips in which said compartments have been positioned and then welded. These are actually tubes dimensioned so as to accommodate the tubes of neutron absorbing material.

Said tubes of neutron absorbing material are advantageously placed—inside said compartments—on the bottom of the cell or on positioning studs which are themselves located on the bottom of the cell. Said tubes are thus easy to manipulate from the top, making it possible in particular for the neutron absorbing material to be completely inspected or even replaced.

Defined between the two types of walls—the walls of the tubes of neutron absorbing material and the walls of the compartments inside which said tubes are located—there is a volume which can advantageously be used for the circulation of a cooling fluid. Said circulation of a cooling fluid can be effected according to different variants.

It is recommended that said volumes communicate with orifices created at the base of the tank. It will be possible to make provision for the forced injection of a cooling fluid through said orifices, the fluid being discharged through the top.

The same orifices can be used to effect intrinsic cooling by natural convection of ambient air. This is done by raising the tank and opening said orifices to the ambient air.

This embodiment of the invention, put into effect with said intrinsic cooling, is particularly preferred.

Irrespective of the embodiment of the invention, the cell which contains the array of tubes is advantageously fitted with a cover. Said cover contributes to the stabilization and rigidity of the assembly.

Irrespective of the arrangement of the array or arrays of tubes within the storage tanks according to the invention (it being possible for said tanks to contain several cells), the following can also be included:

means for homogenizing the radioactive solution;

means for cooling said radioactive solution.

As an example of homogenizing means, there may be mentioned a system for circulating said solution or a system for bubbling gas into the intermediate spaces.

Such means are well known to those skilled in the art. For example, said homogenizing means may include an immersed air-lift system for circulating the solution. The system pumps the solution at a low level and discharges solution at a higher level.

As an example of cooling means, there may be mentioned immersed coils or submerged cooling pins. According to the invention, said forced cooling means can coexist with the above-described means for ensuring intrinsic cooling by natural convection. Such a cooling means may consist of an immersed coil including a number of turns. A cooling liquid flows through the coil.

A further possibility is to position a cell with an array of tubes, according to the invention, in the central space of a traditional annular tank so as to optimize the utilization of the volumes. Such a tank of the invention makes it possible to store radioactive solution on the one hand in the annular channel and on the other hand in the intermediate space between the walls of the compartments within which the tubes containing the neutron absorbing material are located.

The number of tubes and their distribution within a cell of tanks according to the invention are quite obviously governed by the criticality calculation as a function of the chosen embodiment.

The tanks of the invention make it possible to store a given quantity of radioactive solution on a greatly reduced floor space.

Said tanks, which are more compact, also possess a better stability. Their rigidity and mechanical stability give them a good resistance to earthquakes.

The reduction in space requirement makes the equipment easier to transport and to install in nuclear buildings, especially during renovation operations.

In addition, a given radioactive solution can be stored using a tank of the invention with intermediate spaces whose dimensions correspond to approximately twice the width of a traditional tank channel. This enables measuring instruments (sensors, probes etc.) or homogenizing means larger than those used in channel tanks to be introduced into the stored solutions.

It is now proposed to describe the invention with reference to the attached Figures, of which:

Figure 1:
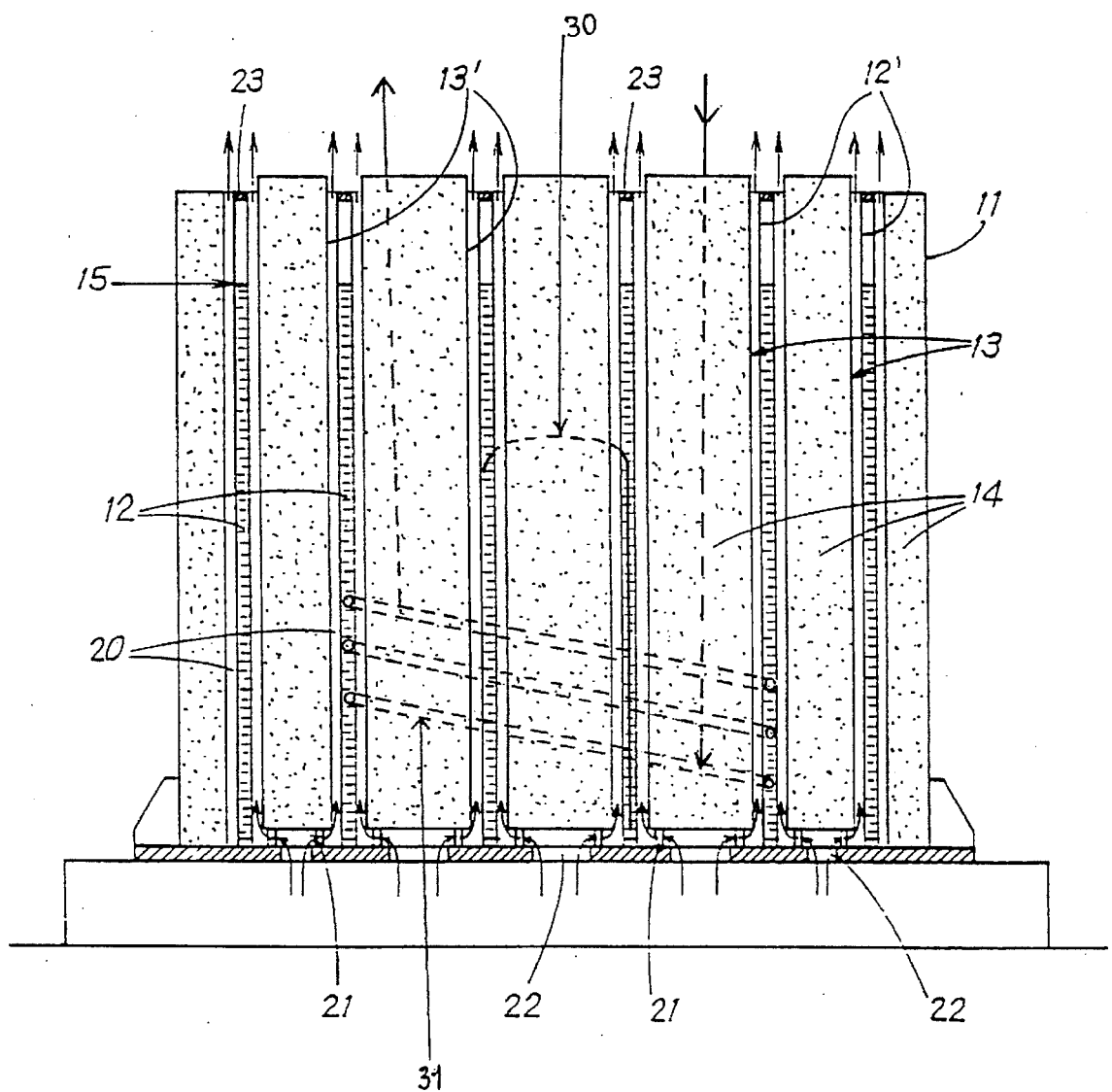
FIG. 1 is a vertical section along I—I of a tank according to the invention.
Figure 2:
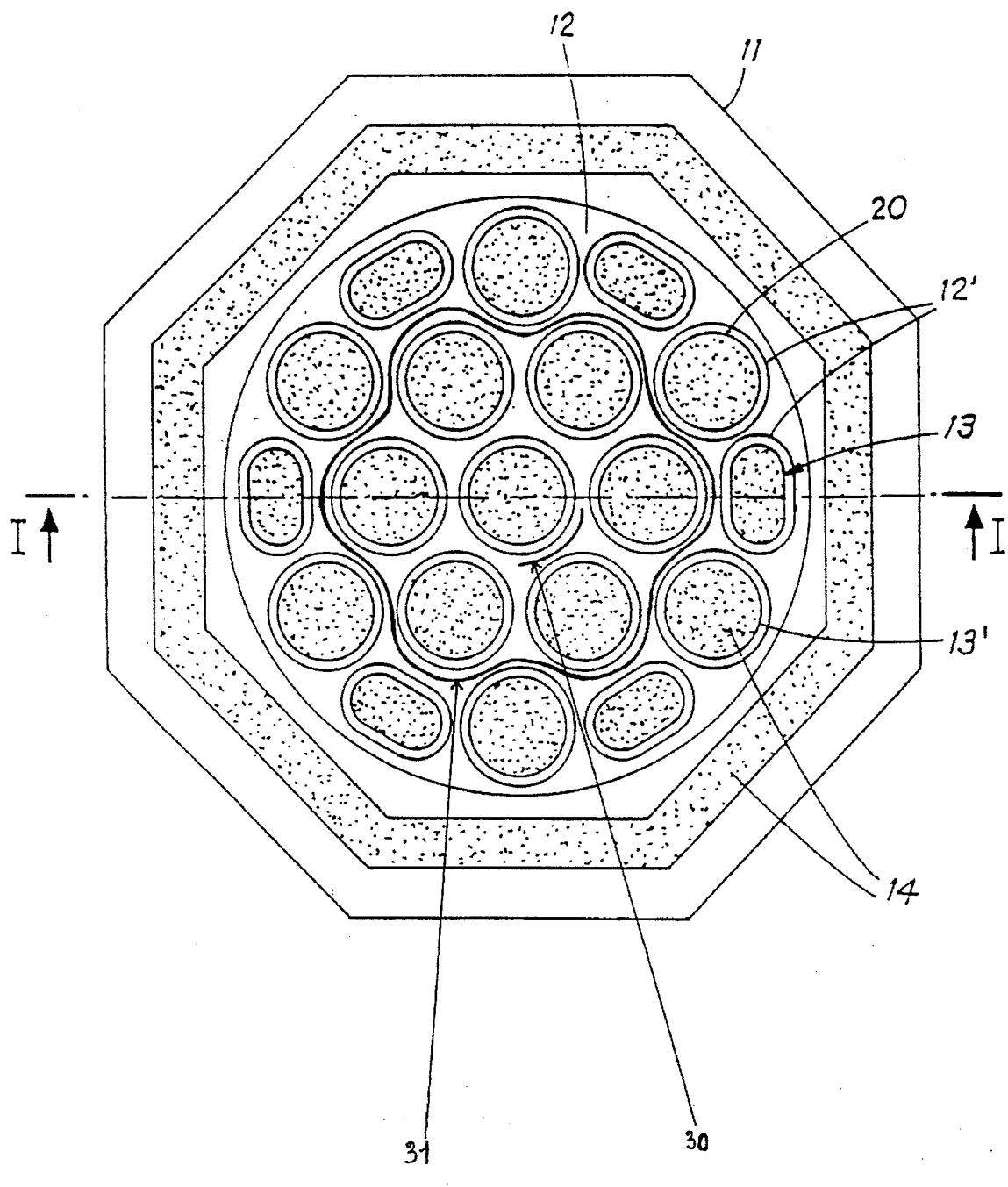
FIG. 2 is a plan view of the latter tank.

In said FIGS. 1 and 2:

11 shows the storage tank, 12 shows the radioactive fissile material solution stored in the intermediate spaces, 13 shows the tubes containing the neutron absorbing material, 13' shows the vertical metal walls of said tubes, 14 shows said neutron absorbing material 30 shows said schematized homogenizing means 31 shows said cooling means.

The tubes 13 are located in compartments distributed throughout the radioactive solution 12. Said compartments are delimited by metal walls 12'.

15 indicates the level of the liquid inside the tank 11.

In the preferred variant illustrated, the tubes of neutron absorbing material 13 are located in compartments, thereby defining volumes 20 for circulation by the convection of ambient air. Said circulation is represented diagrammatically by means of arrows in FIG. 1. Said tubes are located on studs 21. The air enters through the orifices 22 created at the base of the tank, said tank being raised.

Finally, 23 shows a perforated cover. Said cover serves in particular to stabilize the tubes 13 of neutron absorbing material 14.

The value of the tanks of the invention is demonstrated by the data given in the Table below.

An annular tank according to the prior art and a tank with an array of tubes according to the present invention have been dimensioned for given volumes of radioactive solution to be stored, and the reductions in required floor space have been calculated.

| Volume of radio-active solution to be stored ($m^3$) | Diameter of required floor space (reduction) | | |
|---|---|---|---|
| | Annular tank (m) | Array of tubes INVENTION (m) | Reduction in space |
| 0.5 | 2.7 | 1.9 | 32% |
| 1 | 3.3 | 2.33 | 50% |
| 2 | 4.9 | 2.7 | 69% |
| 4 | 6 | 3 | 75% |

What is claimed is:

1. A storage tank for radioactive fissile material solutions, said tank (11) comprising at least one cell for containing a radioactive solution (12) and solid neutron absorbing material (14) for avoiding the risks of criticality, said radioactive solution (12) being separated from said solid neutron absorbing material (14) by metal walls (12', 13'), which tank is characterized in that an array of substantially vertical tubes (13) containing solid neutron absorbing material (14) is arranged within said cell, said tubes (13) having metal walls (13') and being located in compartments which are themselves delimited by metal walls (12') and distributed throughout said radioactive solution (12).

2. A tank according to claim 1, characterized in that the volumes (20) between said tubes (13) and said walls (12') of said compartments are used for the circulation of a cooling fluid.

3. A tank according to claim 2, characterized in that said volumes (20) communicate with orifices (22) created at the base of the tank (11).

4. A tank according to claim 3, characterized in that said tank (11) is raised and in that said orifices (22) are open to the ambient air.

5. A tank according to claim 1, characterized in that it also comprises means for homogenizing said radioactive solution (12).

6. A tank according to any claim 1, characterized in that it also comprises cooling means within said radioactive solution (12).

7. A tank according to any claim 1, characterized in that it is an annular tank within whose central space there is at least one cell containing said array of tubes (13).

* * * * *